UNITED STATES PATENT OFFICE.

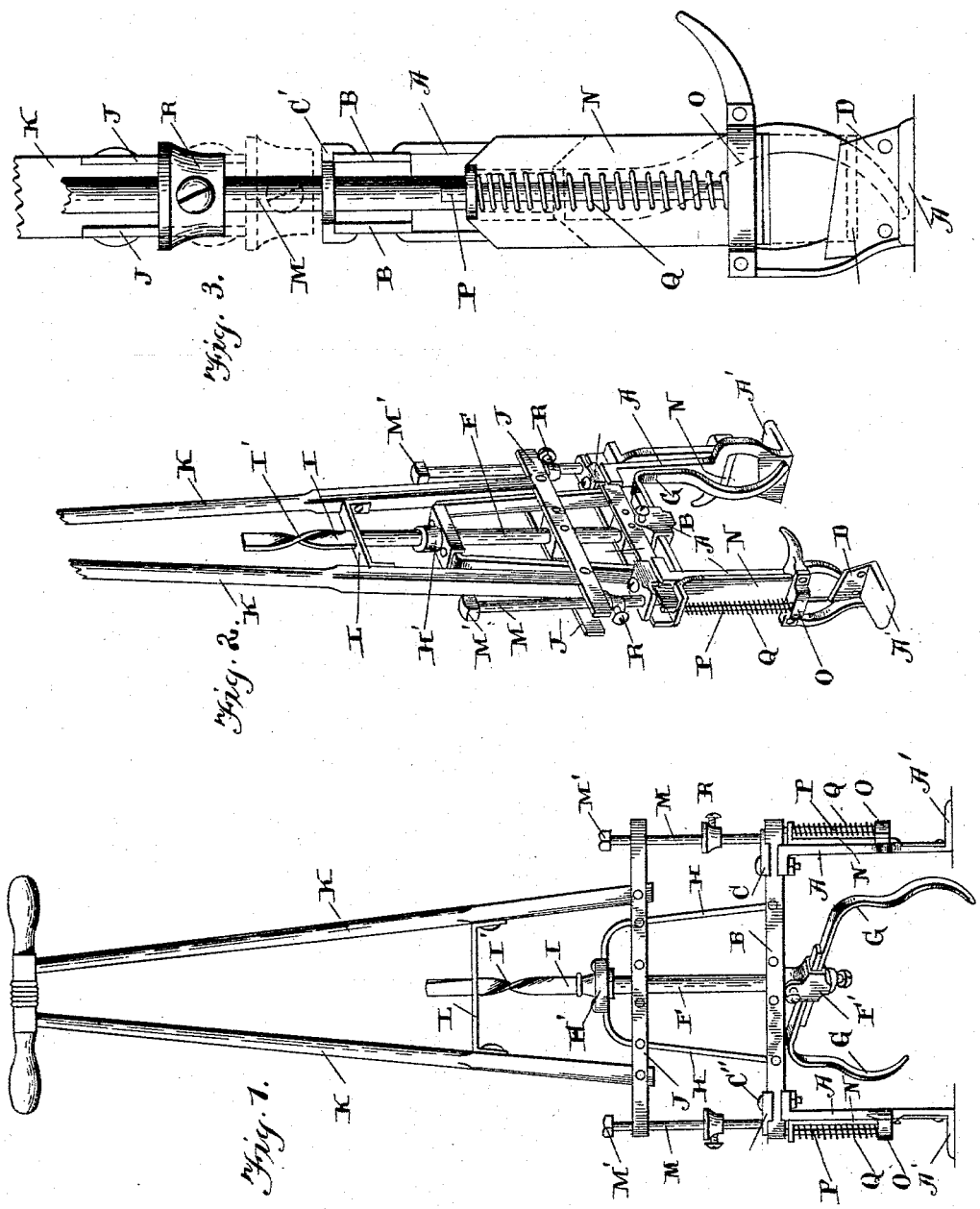

CHARLES D. CARTER, OF SPRING ARBOR, MICHIGAN.

STRAWBERRY-RUNNER CUTTER.

SPECIFICATION forming part of Letters Patent No. 533,787, dated February 5, 1895.

Application filed April 7, 1894. Serial No. 506,761. (No model.)

*To all whom it may concern:*

Be it known that I, CHARLES D. CARTER, of Spring Arbor, in the county of Jackson and State of Michigan, have invented certain new and useful Improvements in Strawberry-Runner Cutters; and I do hereby declare the following to be a full, clear, and exact description of the invention, such as will enable others skilled in the art to which it pertains to make and use it, reference being had to the accompanying drawings, which form part of this specification.

My invention relates to an improvement in strawberry runner cutters; and the object of the same is to provide a machine of simple construction for effectually and rapidly severing the runners from strawberry plants.

The invention consists in the novel features of construction hereinafter fully described and claimed, and illustrated in the accompanying drawings, in which—

Figure 1 is a side elevation of the machine. Fig. 2 is a perspective view of the same, showing its position when the runners have been carried to the knives. Fig. 3 is an end view, showing the knives depressed.

A are standards having feet A' and connected at their upper ends by the parallel cross bars B. The upper ends of the standards are broadened at C where the bars rest thereon and by means of the plates C' and bolts C'' the standards are adjustable toward or away from each other, thus adjusting the distance between the same to the plant being operated upon. The lower ends of the standards are bulged or enlarged and placed therein are the inclined knives D, while at the upper ends of the bulges are projecting guiding noses E.

Journaled between bars B is the vertical shaft F having at its lower end the clamp F' in which are adjustably secured the angular fingers G, the vertical portions of the fingers being curved in opposite directions as shown. The fingers are designed to turn snugly between standards A and are adjustable with relation to each other so as to be conformable to the adjustment of said standards.

Extended upward from bars B are the braces H carrying at their upper ends the bearing H' for the upper portion of shaft F. Above this bearing the shaft is flattened as shown at I which terminates in one spiral turn I'. Movable vertically upon shaft F and braces H are the parallel bars J, which are also parallel with bars B, and extended vertically from these bars are the handle arms K, having between them the slotted cross bar L through which the flattened upper end of the shaft extends as shown.

M are rods movable vertically and provided with stops M' at their upper ends and knives N at their lower ends which latter move in suitable guides O on the standards. Extending vertically from said guides are the rods P which extend through perforated lugs N' at the upper ends of the knives, and about these rods are coiled the springs Q, which serve to hold the knives and their rods M normally raised. The last named rods are provided between their ends with the adjustable stops R.

In operation the machine is set over the plant with its parts in the position shown in Fig. 1. By depressing the handle K the cross bar L moves downward on the flattened spiral portion of the shaft, thereby rotating the same and with it the fingers. This movement gives to the fingers G just half a revolution which carries the runners into the bulges of the standards and directly over the knives D. The downward movement continues after the revolution of the shaft, the bar L moving on flattened portion I, and the stops R are engaged by the cross bars J, thus depressing the rods M and knives N, and severing the runners by the scissors action of knives N and D. A lift on the handle of the machine sufficient to raise it draws upward its movable portion, bars J engaging stops M' serving to separate the knives by drawing upward rods M and the upward movement of bar L traversing the spiral portion of the shaft reverses its movement as well as that of the fingers, so that they are again positioned as indicated in Fig. 1, ready for another operation.

By means of the adjustment before indicated the machine may be widened or narrowed as desired, and the stops M'' may be adjusted to give the knives the desired movement.

Having thus fully described my invention, what I claim as new, and desire to secure by Letters Patent, is—

1. The combination of the standards having bulges therein, knives secured in the bulges, vertically movable knives which cooperate with the first-named knives, fingers for drawing the runners to the bulges of the standards, a means for depressing the knives, and a means for operating the fingers, substantially as shown and described.

2. The combination of the standards having the fixed knives, the vertically movable knives, and the springs arranged as shown for holding the last named knives normally in a raised position, substantially as shown and described.

3. The combination of the depressible knife carrying rods, and the adjustable stops thereon, for the purpose shown and described.

4. The combination of the bars B, the standards upon which they rest, the standards being movable on the bars, clamping plates on the upper edges of the bars, and securing bolts, substantially as shown and described.

5. In a runner cutter the combination of a shaft, fingers on its lower end, a spiral gear at its upper end, a depressible frame for vibrating the shaft, and suitable knives to which the runners are drawn by the fingers, substantially as shown and described.

6. The combination of the shaft, having the flattened portion I near its upper end, the spiral twist terminating said flattened portion, fingers at the lower end of the shaft, a depressible frame carrying a slotted cross bar for vibrating the shaft by moving over the said spiral, and suitable knives to which the runners are drawn by the fingers, substantially as shown and described.

In testimony whereof I affix my signature in presence of two witnesses.

CHARLES D. CARTER.

Witnesses:
J. T. HAMMOND,
B. J. CARTER.